United States Patent
Aronovich et al.

(10) Patent No.: US 10,242,021 B2
(45) Date of Patent: *Mar. 26, 2019

(54) STORING DATA DEDUPLICATION METADATA IN A GRID OF PROCESSORS

(71) Applicant: INTERNATIONAL BUSINESS MACHINES CORPORATION, Armonk, NY (US)

(72) Inventors: Lior Aronovich, Ontario (CA); Vincenzo Pasquantonio, Ontario (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 532 days.

This patent is subject to a terminal disclaimer.

(21) Appl. No.: 14/993,211

(22) Filed: Jan. 12, 2016

(65) Prior Publication Data

US 2017/0199893 A1    Jul. 13, 2017

(51) Int. Cl.
*G06F 17/30* (2006.01)
*H04L 9/06* (2006.01)

(52) U.S. Cl.
CPC .. *G06F 17/30159* (2013.01); *G06F 17/30097* (2013.01); *H04L 9/0643* (2013.01)

(58) Field of Classification Search
CPC .............. G06F 17/30159; G06F 3/0641; G06F 17/30097; H04L 9/0643
See application file for complete search history.

(56) References Cited

U.S. PATENT DOCUMENTS

| | | |
|---|---|---|
| 7,542,975 B2 | 6/2009 | Rjaibi |
| 7,738,466 B2 | 6/2010 | Schwan et al. |
| 8,166,012 B2 | 4/2012 | Reddy et al. |
| 8,321,648 B2 | 11/2012 | Condict |
| 8,375,047 B2 | 2/2013 | Narayanan et al. |
| 9,081,809 B2 | 7/2015 | Aronovich et al. |
| 9,110,936 B2 | 8/2015 | Li et al. |
| 2004/0117345 A1 | 6/2004 | Bamford et al. |
| 2009/0319687 A1 | 12/2009 | Goldstein et al. |
| 2011/0246741 A1* | 10/2011 | Raymond ......... G06F 17/30159 711/170 |
| 2012/0124012 A1* | 5/2012 | Provenzano ...... G06F 17/30162 707/692 |

(Continued)

OTHER PUBLICATIONS

Craig S. Mullins, "Architectures for Clustering: Shared Nothing and Shared Disk," published Jan.-Mar. 2003, http://www.mullinsconsulting.com/db2arch-sd-sn.html, from DB2 Magazine, Q1 2003 (8 pages).

(Continued)

*Primary Examiner* — Kris E Mackes
*Assistant Examiner* — Lin Lin M Htay
(74) *Attorney, Agent, or Firm* — Griffiths & Seaton PLLC

(57) ABSTRACT

Embodiments for storing data deduplication metadata in a grid of processors. Each of a plurality of slices of deduplication metadata is assigned to be stored by a corresponding processor in a grid of processors. Each slice of the plurality of slices includes at least one of a slice of a similarity index and groups of digests corresponding to those of a plurality of representative values in the slice of the similarity index. A hashing method is use to map between a plurality of input representative values and the plurality of slices of deduplication metadata.

18 Claims, 11 Drawing Sheets

(56) References Cited

U.S. PATENT DOCUMENTS

| | | |
|---|---|---|
| 2012/0143835 A1 | 6/2012 | Aronovich et al. |
| 2012/0158672 A1 | 6/2012 | Oltean et al. |
| 2013/0018854 A1* | 1/2013 | Condict ................ G06F 3/0608 707/692 |
| 2013/0124474 A1* | 5/2013 | Anderson ......... G06F 17/30286 707/634 |
| 2013/0232116 A1* | 9/2013 | Aronovich .......... G06F 11/1453 707/640 |
| 2013/0268496 A1 | 10/2013 | Baldwin et al. |
| 2014/0089275 A1 | 3/2014 | Akirav et al. |
| 2014/0156666 A1 | 6/2014 | Jagtiani et al. |
| 2014/0244598 A1 | 8/2014 | Haustein et al. |
| 2014/0279900 A1 | 9/2014 | Gupta et al. |
| 2014/0279927 A1 | 9/2014 | Constantinescu et al. |
| 2014/0304357 A1 | 10/2014 | Bestler et al. |
| 2014/0358871 A1 | 12/2014 | Cideciyan et al. |

OTHER PUBLICATIONS

Stoica et al., "Chord: A Scalable Peer-to-peer Lookup Service for Internet Applications," SIGCOMM'01, ACM, San Diego, California, Aug. 27-31, 2001 (11 pages).

Johnson et al., "Designing Distributed Search Structures with Lazy Updates," Conference: Proceedings of the 1993 ACM SIGMOD International Conference on Management of Data, Washington, D.C., May 26-28, 1993 (35 pages).

* cited by examiner

STORING DATA DEDUPLICATION METADATA IN A GRID OF PROCESSORS

BACKGROUND OF THE INVENTION

Field of the Invention

The present invention relates in general to computers, and more particularly for storing data deduplication metadata in a grid of processors in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

Embodiments for storing data deduplication metadata in a grid of processors are provided. In one embodiment, by way of example only, each of a plurality of slices of deduplication metadata is assigned to be stored by a corresponding processor in a grid of processors. Each slice of the plurality of slices includes at least one of a slice of a similarity index and groups of digests corresponding to those of a plurality of representative values in the slice of the similarity index. A hashing method is used to map between a plurality of input representative values and the plurality of slices of deduplication metadata. In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
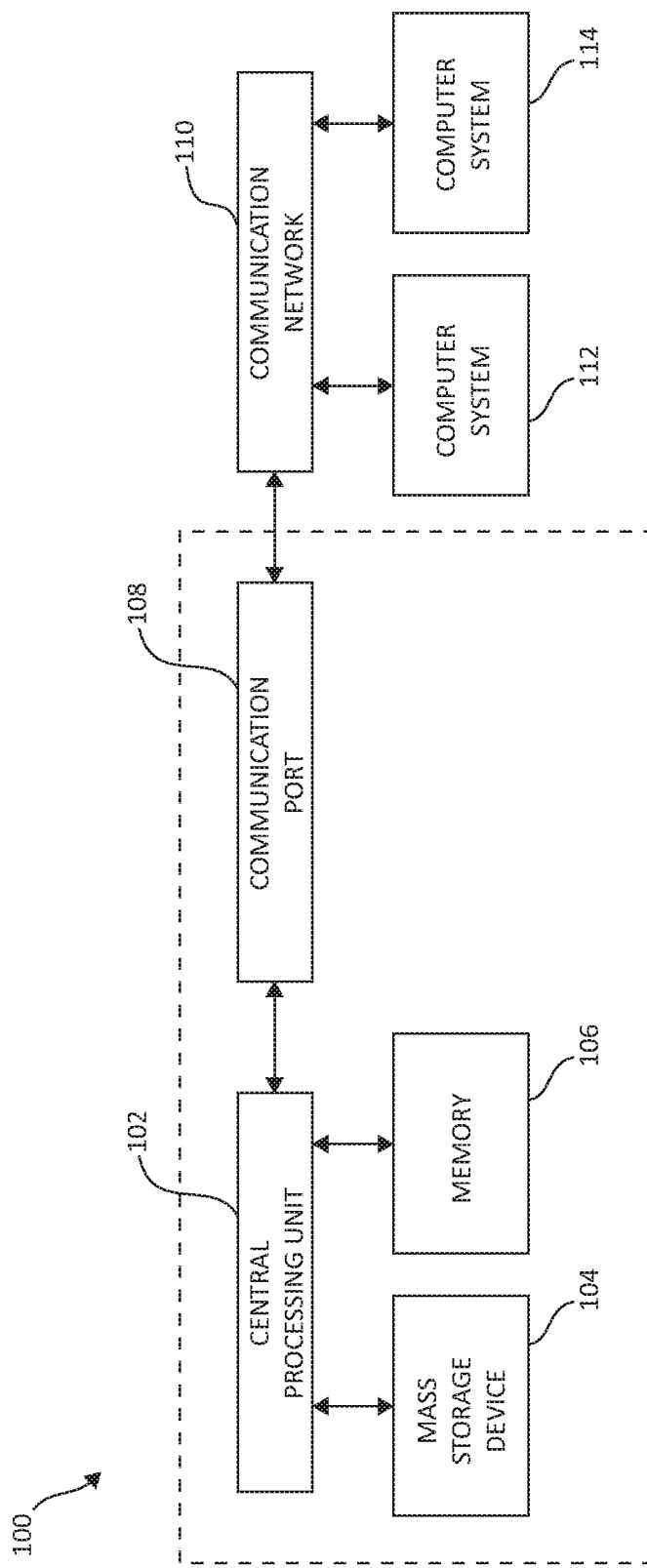
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is partitioned into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form.

Existing distributed deduplication technologies are typically bounded by their supported size of data repositories. Many existing deduplication technologies are based on maintaining an index of values, known as fingerprints or digests, where a small fingerprint (ranging for example between 16 bytes and 64 bytes) represents a larger deduplication block of data (ranging for example between 4 KB and 256 KB) in the repository. The fingerprint values are commonly cryptographic hash values calculated based on the segments' data, using for example SHA-1 or SHA-256. Identifying fingerprint matches, using index lookup, enables to identify data matches and subsequently store references to data which already exists in a repository.

In this approach, larger deduplication blocks reduce the resolution and effectiveness of deduplication, and smaller deduplication blocks generate a large number of fingerprints to store, which coupled with the size of a fingerprint can be prohibitive. For example, for 1 Petabyte of deduplicated data, 4 KB block size, and 32 bytes fingerprint size (e.g. of SHA-256), the storage required to store the fingerprints is 8 Terabytes. Maintaining a fingerprints index for such volumes of fingerprints is typically difficult, and existing techniques do not scale to these sizes while maintaining performance. For this reason, hash based deduplication technologies typically support relatively smaller repositories (on the order of tens of TB).

Existing distributed deduplication technologies are usually based on the above hash deduplication approach, and are therefore typically bounded in scale and performance. To address this challenge, similarity based data deduplication approaches have been introduced, which enable to achieve efficient data deduplication with small data blocks, by using a two step process for searching data during deduplication. In a first step, similar data is searched in a repository. The granularity for this step is large data blocks, e.g. 8 MB. In a second step, matches of identical data are determined in the similar input and repository data. The granularity for this step is smaller data blocks, e.g. 2 KB. Depending on the matching algorithm that is used, a single byte granularity is also supported. Further included in the first step is a calculation of similarity characteristics as well as digest segments and respective digest values, of the input chunk of data. These calculations are based on a single calculation of rolling hash values. In the second step, reference digests of the similar repository intervals are retrieved, and then the input digests are matched with the reference digests, to identify data matches.

The similarity based data deduplication approach is scalable and efficient because the index used in the similarity step is compact and simple to maintain and search within. This is because the representation elements used for the similarity search are very compact relative to the data they represent, e.g. 16 bytes representing 4 megabytes. Once similar data is found, digests of the similar data or the similar data itself are loaded into memory, to perform an efficient data matching process that uses hash lookup. This second step process is also efficient in both memory and processing time. Overall, the similarity based data deduplication approach provides scalability to very large data repositories, as well as high efficiency and performance.

In a current implementation of similarity based data deduplication, the similarity index is stored in a shared storage. This current implementation does not support shared nothing architecture, i.e. where no storage is shared among processors in a processor grid, and is further bounded to a low number of processors to remain efficient, therefore is not scalable.

To support a distributed shared nothing architecture, with a large number of processors (e.g., thousands), and provide global, grid wide, high resolution and efficient data deduplication for large capacity of data in this distributed environment, new deduplication mechanisms are beneficial. In general, highly distributed and global data deduplication is an emerging field with a wide applicability scope. In addition, various entities are looking to add data deduplication capabilities to their highly distributed storage and file systems, to which new deduplication mechanisms would benefit.

In view of the foregoing, the mechanisms of the illustrated embodiments, among other beneficial aspects, address the following challenge. Given a grid of processors, on the scale of thousands of processors, and supporting dynamic addition, removal and failure recovery of processors, an objective may be made for the implementation of a data deduplication technology that provides beneficial features, such as (1) global grid wide data deduplication, (2) support of very large capacity of data, scaling to petabytes of data, (3) high resolution deduplication, to wit: small blocks should be used for deduplication, on the scale of a few kilobytes or less, (4) efficient inline deduplication, to wit: resource consumption of the deduplication mechanism should be low, and deduplication should be done inline with the data ingest process, and (5) fault tolerance. While the objective may be considered in view of a shared nothing architecture, it is also beneficial for mechanisms to apply the beneficial features previously discussed to shared storage architectures.

The mechanisms of the illustrated embodiments, following, address the objective proposed above by providing a variety of attendant benefits. In a processor grid architecture, in one embodiment, each processor is configured to store (1) a slice of the deduplication metadata, and (2) user data stored via local ingests. Each slice of the deduplication metadata, in one embodiment, includes a slice of the similarity index, and groups of digests that correspond to the representative values in the slice of the similarity index. Each representative value corresponds to a specific unit of data, denoted as a similarity unit, that is represented in the index, where the size of the similarity units is fixed, e.g. 2 MB. An entry in the similarity index consists of a representative value of the similarity unit and a storage address of the similarity unit's digests.

In view of these aspects, use of the similarity index in the mechanisms of the illustrated embodiments, provides global grid wide data deduplication. The similarity index is compact, and dynamically scales as processors are added or removed. The digests in a group corresponding to a similarity unit, are calculated based on deduplication blocks, e.g. of size 2 KB, and the digests appear in the group in the order of their appearance in the data of the similarity unit.

Turning now to the figures, and first to FIG. 1, an exemplary architecture 100 of a computing system environment is depicted. Architecture 100 may, in one embodiment, be implemented at least as part of a system for effecting mechanisms of the present invention. The computer system embodied in architecture 100 includes at least one central processing unit (CPU) 102, which is connected to communication port 108 and memory device 106. The communication port 108 is in communication with a communication network 110. The communication network 110 may be configured to be in communication with systems 112, 114 and architecture 100, which may include storage devices 104. The storage systems may include hard disk drive (HDD) devices, solid-state devices (SSD) etc., which may be configured in a redundant array of independent disks (RAID).

The operations as described below may be executed on storage device(s) 104, located in system 100 or elsewhere, and may have multiple memory devices 106 working independently and/or in conjunction with other CPU devices 102. Memory device 106 may include such memory as electrically erasable programmable read only memory (EEPROM) or a host of related devices. Memory device 106 and storage devices 104 are connected to CPU 102 via a signal-bearing medium. In addition, memory device 106 and the CPU 102 may be embedded and included in each component of the computing system 100 as a part of a larger processor grid system. Each storage system may also include separate and/or distinct memory devices 106 and CPU 102 that work in conjunction or as a separate memory device 106 and/or CPU 102. As one of ordinary skill in the art will appreciate, a number of systems 100 may be configured in a connected and/or distributed way, physically located together or across a long geographically connected network, for example.

Figure 2:
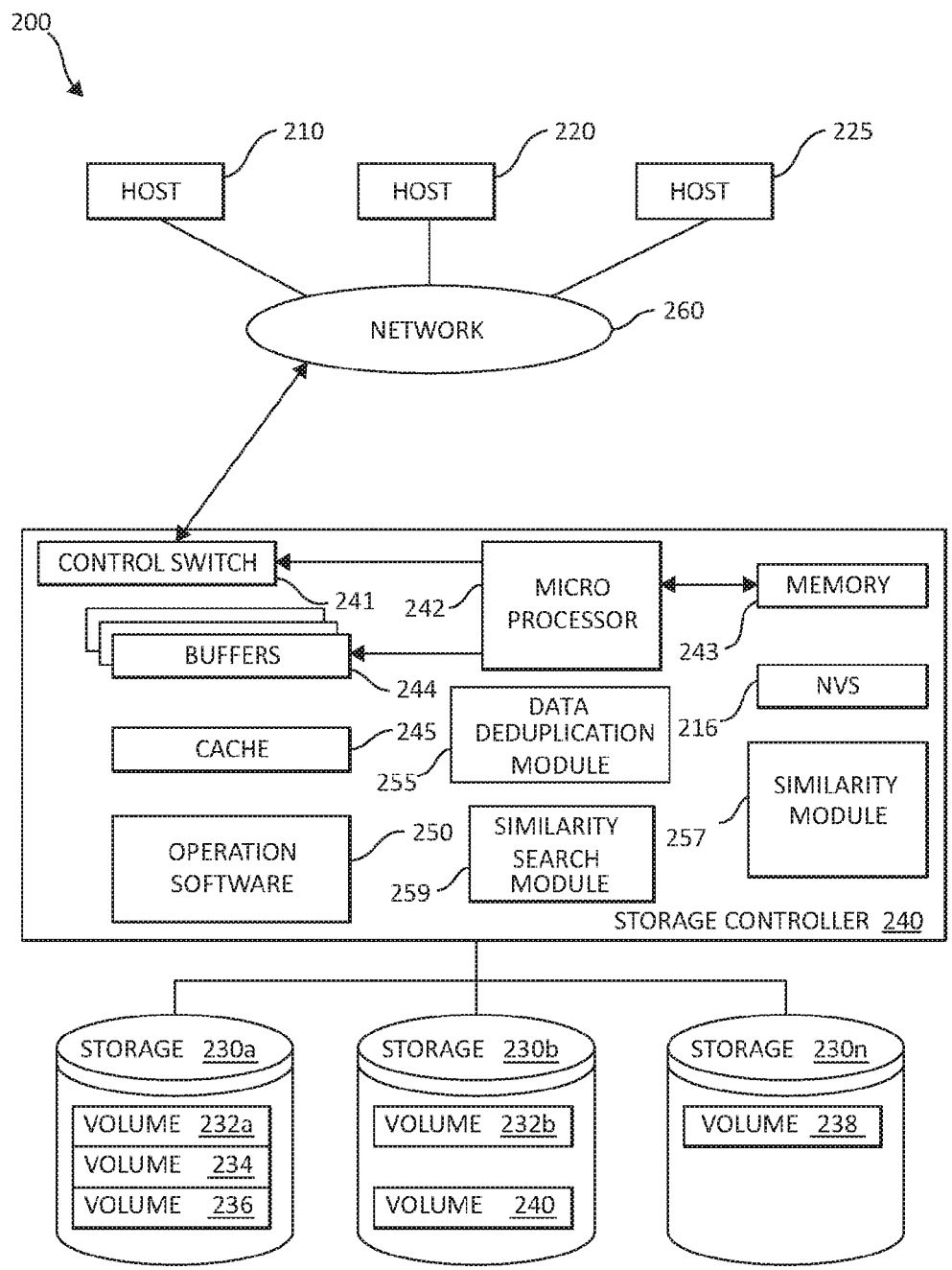
FIG. 2 is a block diagram illustrating a hardware structure of data storage system in which aspects of the present invention may be realized.

Turning now to FIG. 2, following; FIG. 2 is an exemplary block diagram showing a hardware structure of a data storage system 200 that may be used in the overall context of performing functionality according to various aspects of the present invention. Data storage system 200 may for example, in one embodiment, implement a data deduplication system in a processor grid architecture as will be further described.

Host computers 210, 220, and 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. Data storage system 200 may implement additional functionality; and one of ordinary skill in the art will recognize that a variety of deduplication, encryption, data processing, etc. hardware and software, separately or in combination, may be utilized to implement the functionality according to aspects of the illustrated embodiments.

Network connection 260 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes found in a distributed computing environment.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data deduplication module 255, a similarity module 257, and a similarity search module 259, as well as a number of repositories (not shown). The data deduplication module 255, similarity module 257, similarity search module 259, and repositories may operate in conjunction with each and every component of the storage controller 240, the hosts 210, 220, 225, and storage devices 230. The data deduplication module 255, similarity module 257, similarity search module 259, and repositories may be structurally one complete module or may be associated and/or included with other individual modules or other structures. The data deduplication module 255, similarity module 257, similarity search module 259, and repositories may also be located in the cache 245 or other components, as one of ordinary skill in the art will appreciate.

The data deduplication module 255, similarity module 257, similarity search module 259, and repositories may individually and/or collectively perform various aspects of the present invention as will be further described. For example, the data deduplication module 255 may perform various data deduplication functionality in accordance with aspects of the illustrated embodiments.

The similarity module 257 may perform a variety of functionality as will be further described, such as maintaining a similarity index (with accompanying slices), as will be further described. The similarity search module 259 may also perform a variety of functionality as will be further described, such as searching for representative values in a particular deduplication metadata slice, again as will be further described. As one of ordinary skill in the art will appreciate, the data deduplication module 255, similarity module 257, similarity search module 259, and repositories may make up only a subset of various functional and/or functionally responsible entities in the data storage system 200.

Other ancillary hardware may be associated with the storage system 200. For example, as shown, the storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data deduplication module 255, similarity module 257, similarity search module 259, and repositories, or other blocks of functionality, in which information may be set. Multiple buffers 244 may be implemented with the present invention to assist with the operations as described herein.

Figure 3:
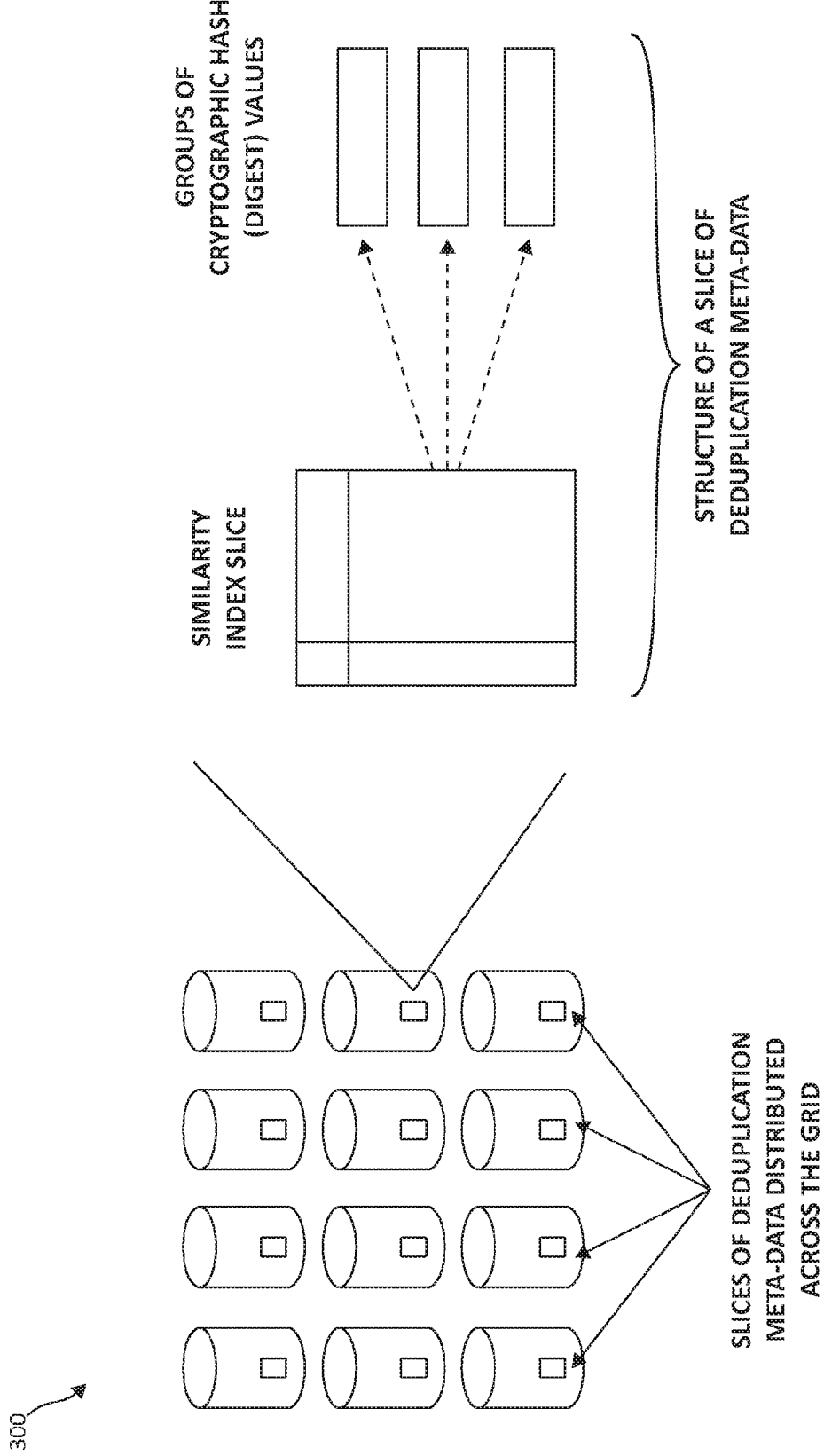
FIG. 3 is a block diagram illustration of an exemplary embodiment for storing data deduplication metadata in a grid of processors in a shared nothing architecture, in which aspects of the present invention may be realized.

FIG. 3, following, illustrates an exemplary embodiment for storing data deduplication metadata in a grid of processors in a shared nothing architecture 300. As previously described, in the depicted embodiment, each processor is configured to store a slice of the deduplication metadata, and user data stored via local ingests.

As shown, each slice of the deduplication metadata incorporates a slice of the similarity index, and groups of digests that correspond to the representative values in the slice of the similarity index. Each representative value corresponds to a specific unit of data, denoted as a similarity unit, that is represented in the index, where the size of the similarity units is fixed, e.g. 2 MB. An entry in the similarity index then, includes a representative value of the similarity unit and a storage address of the similarity unit's digests. As previously mentioned, the digests in a group corresponding to a similarity unit, may be calculated based on deduplication blocks, e.g. of size 2 KB, and the digests then appear in the group in the order of their appearance in the data of the similarity unit.

In one embodiment, the association of a representative value to slices is calculated using a consistent hashing method (e.g., a Highest Random Weight hashing method). In this method, for a given representative value denoted as rval, a hash value $h[i]=H(rval, slice\_id[i])$ is calculated for each slice i using a hash function H, and the slice selected for the representative value and its digests is the one for which the $h[i]$ value is the highest.

When a slice is added or removed, e.g. by adding or removing a processor, only [# rvals/# slices] representative values on average should be remapped. The representative values and digests are inherently balanced between the slices via the hash function H, also when slices are added or removed. Rather than calculating $h[i]$ for all slices, a hierarchical structure can be applied to the slices to provide a logarithmic calculation time.

Figure 4:
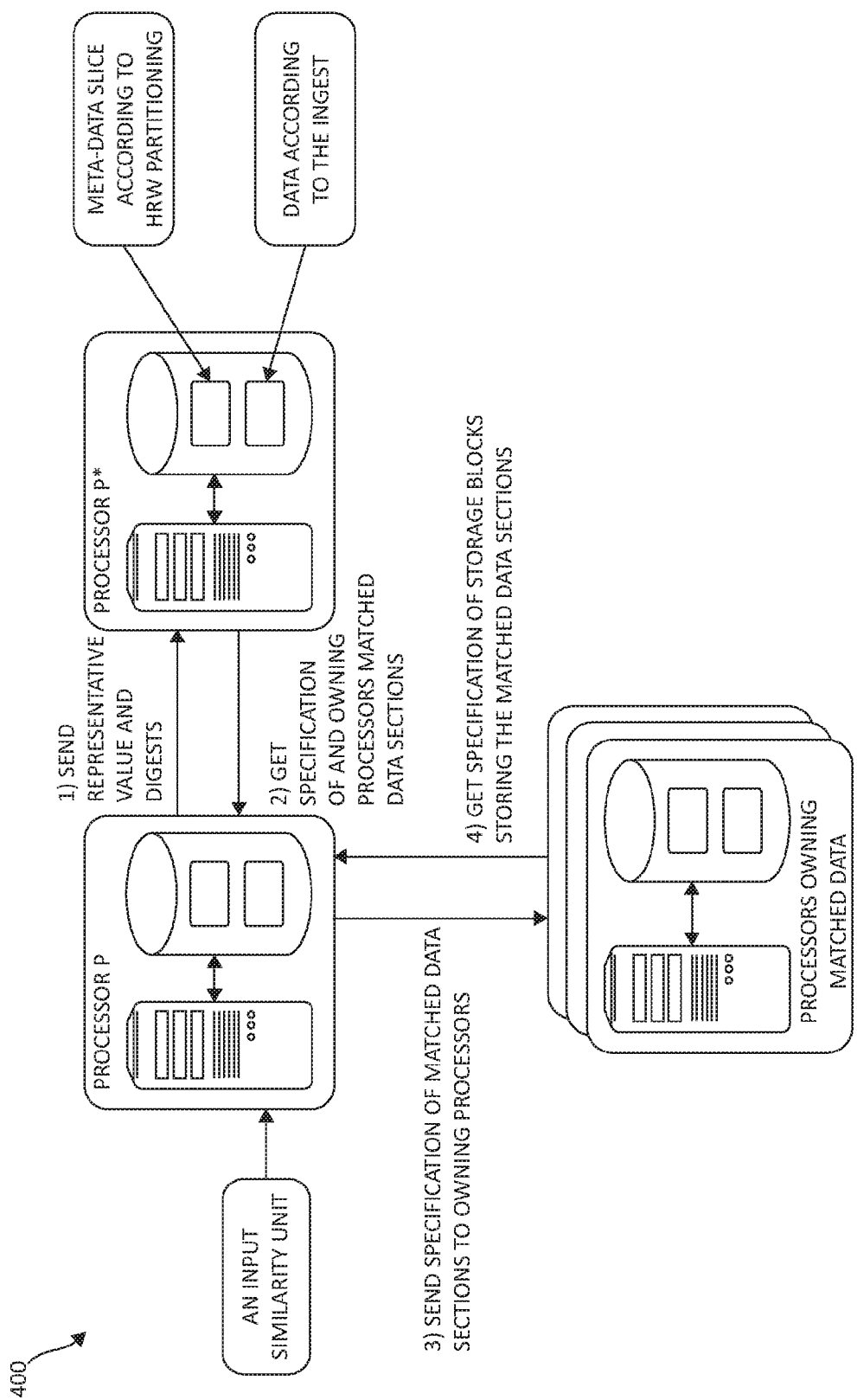
FIG. 4 is a block diagram of an exemplary methodology for global distributed data deduplication in a shared nothing grid of processors, including an exemplary architecture and sequence of messages, again in which aspects of the present invention may be realized.
Figure 5A:
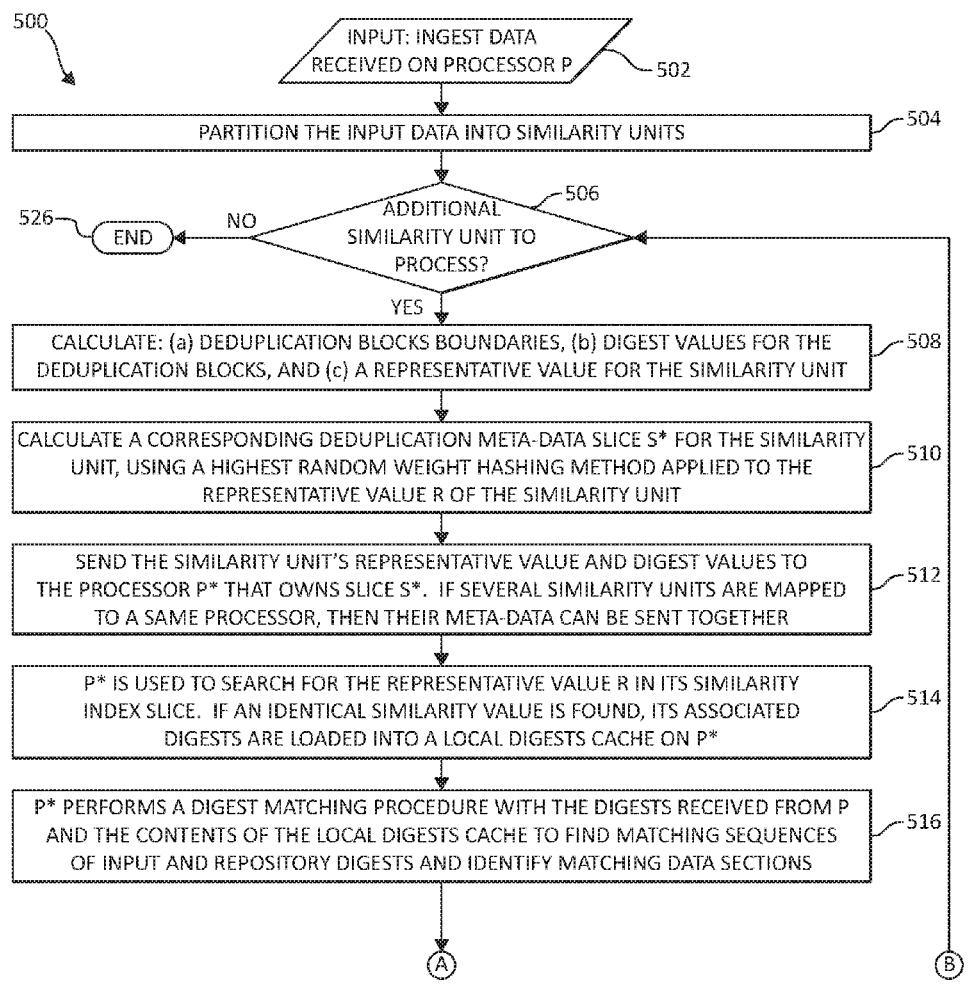
FIG. 5A is a flow chart diagram of an exemplary method for global distributed data deduplication in a shared nothing grid of processors according to one embodiment of the present invention.
Figure 5B:
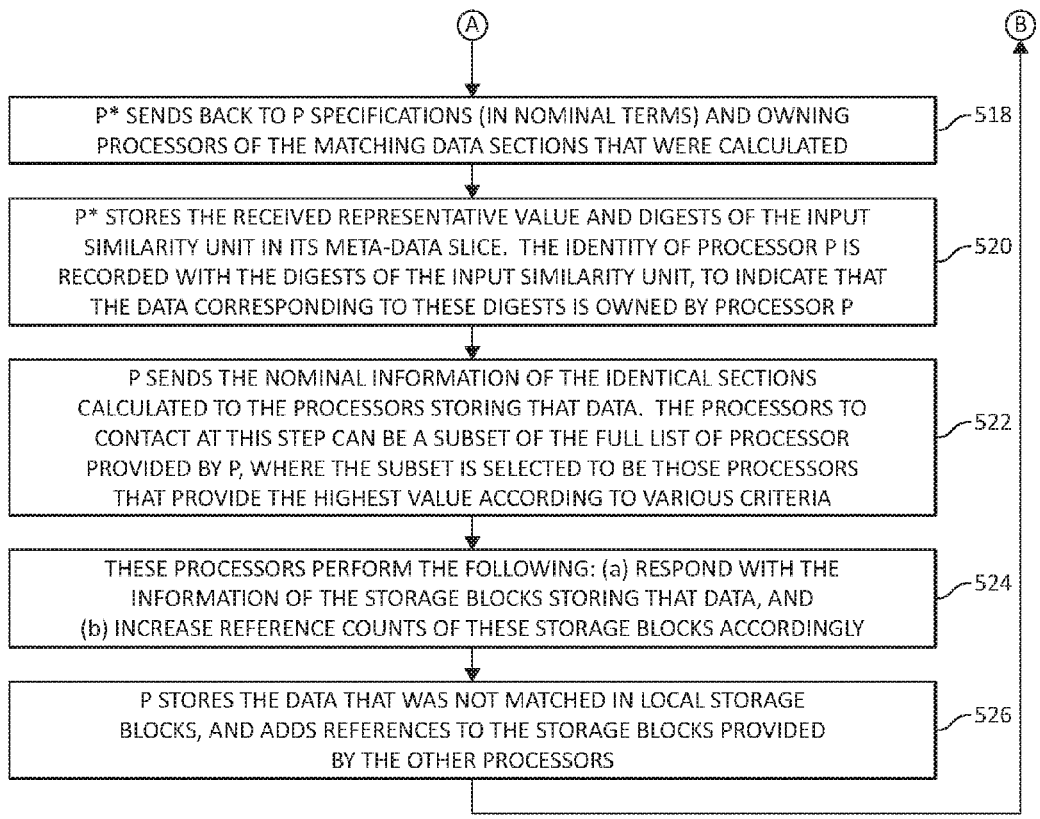
FIG. 5B is a continuation of the flow chart diagram first presented in FIG. 5A, previously.

FIG. 4, following, describes an architecture 400 and sequence of message between components for global distributed data deduplication in a shared nothing grid of processors, according to one embodiment of the present invention. FIG. 4, as shown, describes the architecture 400 and sequencing of the deduplication process in block diagram form; FIGS. 5A and 5B, following, describe the sequence of messages in flow chart diagram form.

Examining FIG. 4, the components/nomenclature that will be used to describe the global distributed data deduplication functionality involves processor P as shown, which is in communication with and between an additional processor P* and other processors in the processor grid owning matched data as shown. Each of the processors P, P*, and other owning processors are associated with their own respective local storages, also as shown (e.g., the local storages are not shared between processors P, P* and the other owning processors). Further, and as shown, various information may be stored in the local storage, such as metadata slices according to HRW partitioning, and data according to a particular ingest.

FIG. 4 also depicts various sequencing of messages between the processors P, P*, and other processors owning matched data as shown, and as follows. In step 1, processor P sends a representative value and digests corresponding to a given similarity unit to the processor P*, that owns the metadata slice that corresponds to the given representative value. Processor P* responds to processor P in step 2 with specification and owning processors information of matched data sections, that were calculated by processor P* for the given similarity unit. Processor P, in step 3, then sends the specification information of the matching data sections to the owning processors of the matched data, which respond in step 4 with specification information of storage blocks of the owning processors storing the particular matched data sections.

With FIG. 4 in view, method 500 in FIG. 5A and FIG. 5B, following, describes an exemplary method for global distributed data deduplication in a shared nothing architecture, giving additional context to the components and sequence of messaging first seen in FIG. 4, previously. Turning first to FIG. 5A, as a first step 502, ingest data is received on processor P, which is partitioned into similarity units (e.g., of size 2 MB) in step 504.

For each of the following steps 506-524, the following are then performed for each similarity unit, as decision step 506 queries whether additional similarity units remain to process. In step 508, the following are calculated for the similarity unit: (a) deduplication blocks boundaries, (b) digest values for the deduplication blocks, and (c) a representative value for the similarity unit. The deduplication blocks can be of variable size, and their boundaries can be determined using a data defined chunking algorithm. A mean size of the deduplication blocks can be for example 2 KB. A digest value is calculated for each deduplication block, where the digest value is a cryptographic hash value calculated based on the data of the deduplication block. A representative value for the similarity unit can be calculated based on the calculated digest values.

A corresponding deduplication metadata slice S* is calculated for the similarity unit, using a consistent hashing method (e.g., a highest random weight hashing method) applied to the representative value R of the similarity unit (step 510). Slice S* will be used for searching of similar data and for storage of deduplication meta-data of the similarity unit.

The similarity unit's representative value and digest values are sent to the processor P* that owns slice S* (step 512). If several similarity units are mapped to a same processor, then their meta-data can be sent together.

In step 514, following, P* is used to search for the representative value R in its similarity index slice. If an identical similarity value is found, its associated digests are loaded into a local digests cache on processor P*.

Processor P* performs, in step 516, following, a digest matching procedure with the digests received from processor P and the contents of the local digests cache to find matching sequences of input and repository digests and identify matching data sections. As an optimization, processor P* may attempt, before performing a similarity search, to load into the local cache digests that are determined as relevant based on information of similar repository data, such as correlation to a previous version of files or storage objects. Then processor P* may attempt to deduplicate the input digests with the contents of the local digests cache, and perform similarity search only if deduplication of the input similarity unit is insufficient.

Turning now to FIG. 5B, in the following step 518, processor P* sends back to processor P specifications (in nominal terms) and owning processors of the matching data sections that were calculated. The data of these sections can be owned by several processors in the grid.

Processor P* then stores the received representative value and digests of the input similarity unit in its meta-data slice. The identity of processor P is recorded with the digests of the input similarity unit, to indicate that the data corresponding to these digests is owned by processor P (step 520). This information is used later on when these digests are matched with other input digests, to specify the location of the corresponding data.

In the following step 522, processor P sends the nominal information of the matching data sections calculated to the processors storing that data. The processors to contact at this step can be a subset of the full list of processor provided by P*, where the subset is selected to be those processors that provide the highest value according to various criteria. One example is processors that own more data that was matched by input data. Another example is processors whose capacity and/or response time for subsequent requests generated by processor P to provide the referenced data will be faster/more efficient to perform and send to processor P.

These contacted processors perform the following: (a) respond with the information of the storage blocks storing that data, and (b) increase reference counts of these storage blocks accordingly (step 524).

Finally, processor P stores the data that was not matched in local storage blocks, and adds references to the storage blocks provided by the other processors (step 526). Returning now to FIG. 5A, and to decision step 506, if no additional similarity units are found to process, the method 500 ends (step 526).

Figure 6:
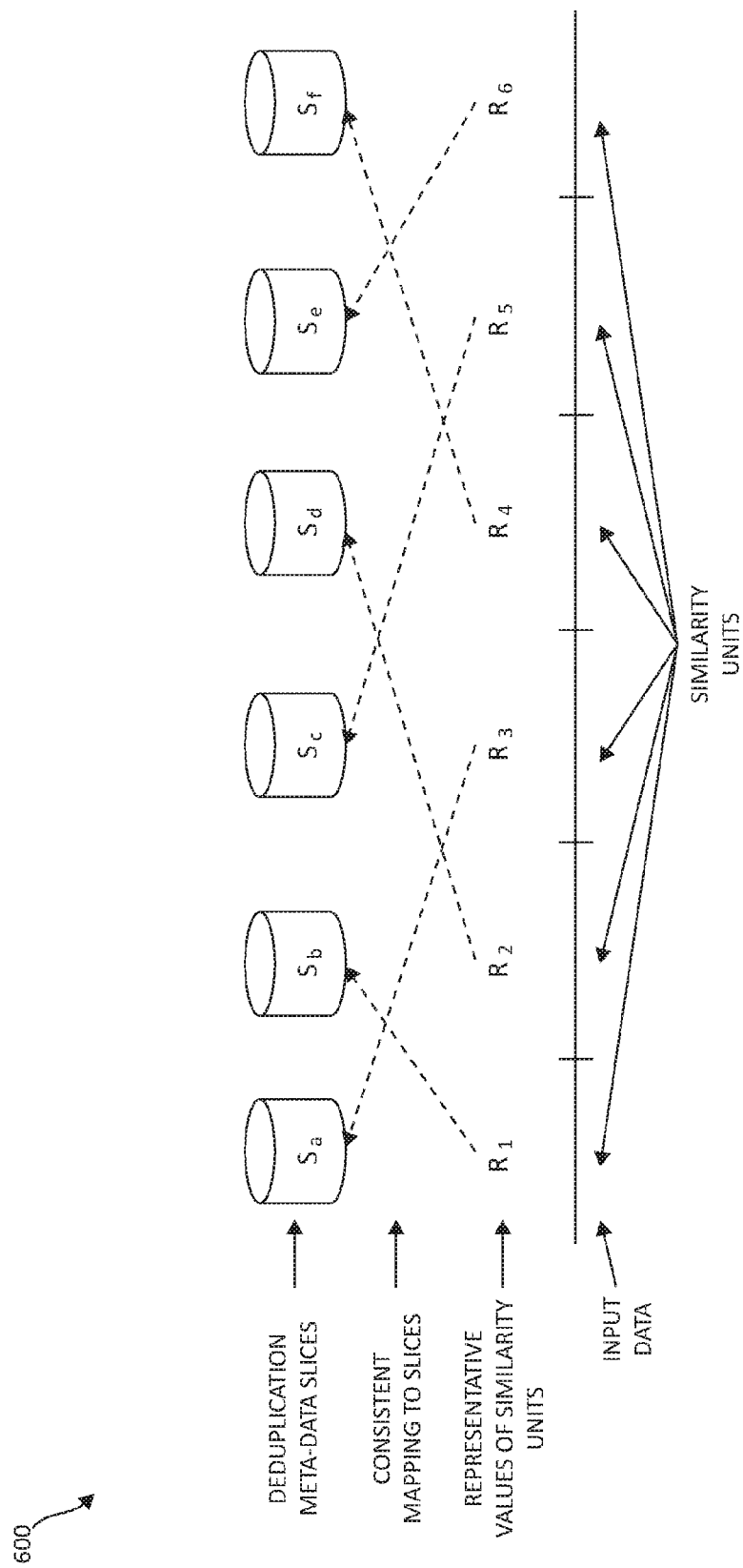
FIG. 6 is a block diagram of exemplary consistent mapping of representative values to data deduplication metadata slices, according to one embodiment of the present invention.

FIG. 6, following, illustrates, in block diagram format, the consistent mapping of representative values to data deduplication meta-data slices in illustration 600. Given a representative value R (corresponding to the input data being partitioned into the depicted similarity units), a consistent hashing method (e.g., a Highest Random Weight hashing method) is used to determine the consistent mapping of R to a deduplication metadata slice S owned by processor P. FIG. 6 shows representative values R[1 . . . 6], corresponding to input similarity units, and their association, as an example, to metadata slices of the set of slices S[a . . . f], using a consistent hashing method.

Figure 7:
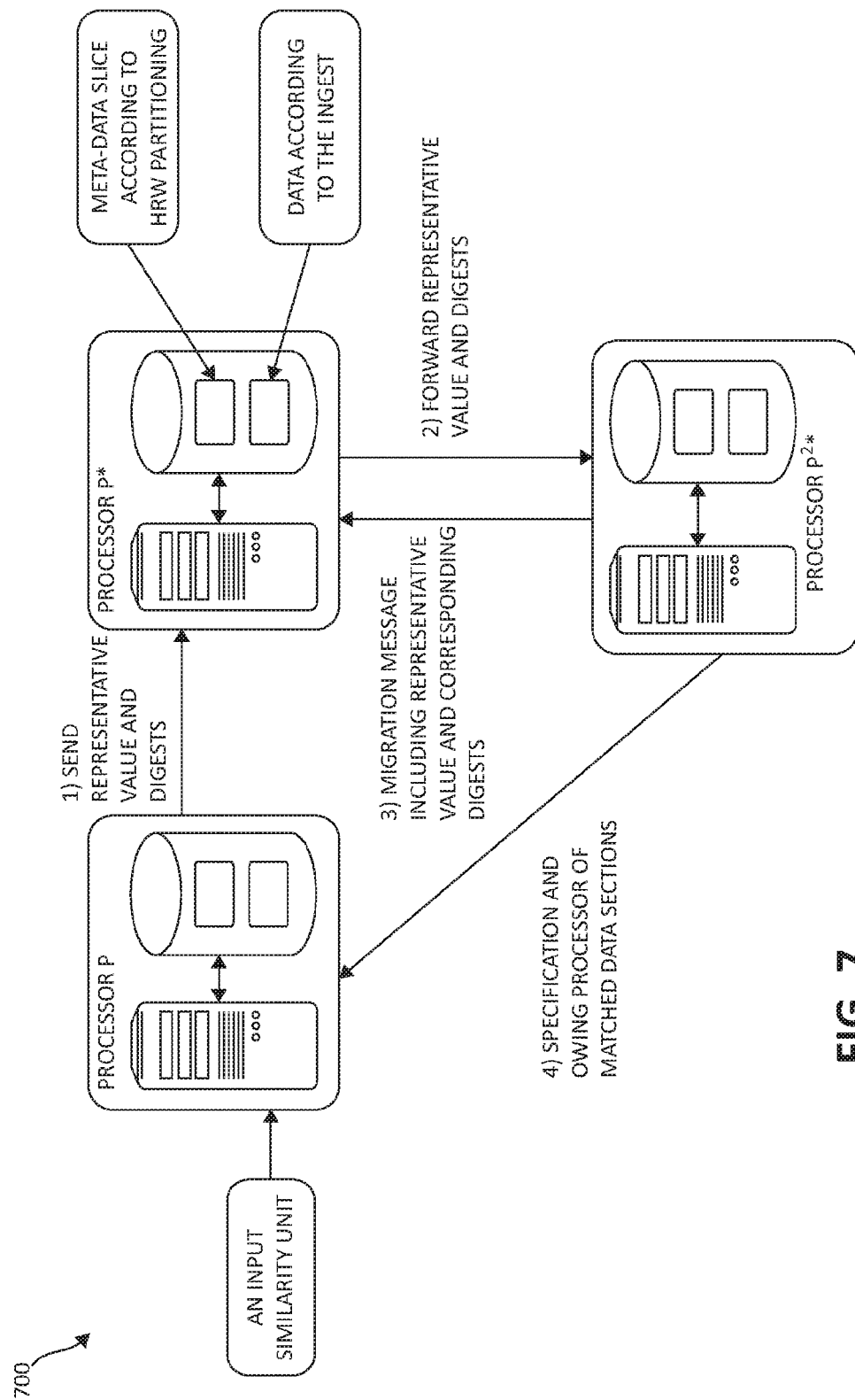
FIG. 7 is a block diagram of an exemplary embodiment for rebalancing deduplication metadata when a processor is added to the grid of processors, here where the input representative value is found along the search chain, again in which aspects of the present invention may be realized.
Figure 8:
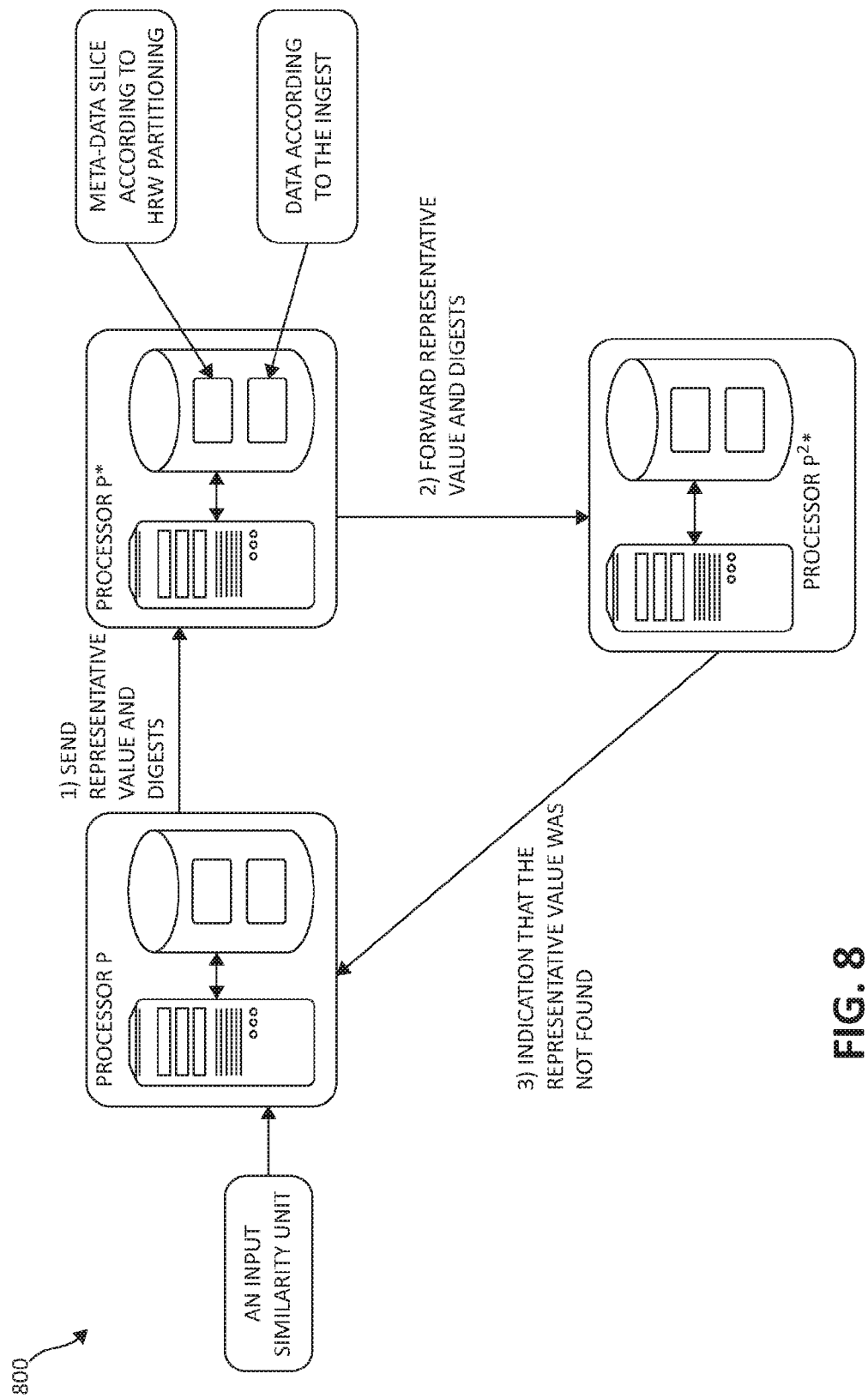
FIG. 8 is a block diagram of an additional exemplary embodiment for rebalancing deduplication metadata when a processor is added to the grid of processors, here where the search chain reaches a fully rebalanced processor and the input representative value is not found, again in which aspects of the present invention may be realized.

FIGS. 7, and 8, following, illustrate various exemplary rebalancing functionality for deduplication metadata across a processor grid when a processor is being added to the grid. In a first case depicted in FIG. 7, an input representative value is found along the search chain. In a second case depicted in FIG. 8, respectively, the search chain reaches a fully rebalanced processor and the input representative value is not located.

In both FIGS. 7 and 8 as a first step, a new deduplication metadata slice is initialized for the new processor to own. The new slice receives metadata uniformly from each of the other slices. Namely, each of the other slices contributes a proportional number of entries to the new slice.

While existing consistent hashing methods require scanning the existing entries to determine the entries that should be migrated to the new slice (only a proportional subset of each slice has to be actually migrated), these existing methods overlook the cost of scanning all the entries. Especially in large scale storage systems, where scanning involves reading many entries from storage, the cost of scanning can be potentially significant. Even if scanning is done in the background, the scanning operation is a potentially costly process that can generate substantial input/output (I/O) load.

To help alleviate the resource costs associated with current scanning operations, a rebalancing mechanism is now introduced in accordance with various aspects of the present invention. The rebalancing mechanism provides, among other aspects, the following. First, entries are identified for rebalancing only when a query is made, where the query has to access these entries for its own processing, therefore avoiding additional overhead. Second, the mechanism applies an extended chained search operation during queries to identify entries to be re-balanced, where the chained search operation consists of a number of hops determined by a statistical calculation. This enables to further reduce the resource consumption of the extended search operations.

In one embodiment, the rebalancing mechanism may proceed as follows. In a first step, and as previously described, one or more processors are added to the existing processor grid. Each processor in the grid maintains a particular attribute. This attribute may be denoted, for example, as 'rebalancing status'. This attribute indicates if migration of entries to that particular processor is in-process or complete. This attribute may be initialized to the value of 'in-process'.

In a following step, a processor being added to the grid calculates the expected proportion of entries to be migrated to that processor. That proportion is the total number of entries at the time of the processor joining the grid divided by the number of processors including the added processor. As long as the actual number of entries migrated to the processor is lower than this expected proportion, the rebalancing status of the processor remains in-process. The rebalancing status is changed to completed when the number of entries migrated to the processor is equal or exceeds the expected proportion.

When a representative value is being searched, the ingesting processor P calculates the slice and owning processor P* for searching the representative value, and sends to processor P* the input representative value and digests. Processor P* searches for the representative value. If the representative value is found, then processor P* sends a reply to processor P, and the mechanism proceeds as specified in the method 500 for distributed data deduplication as described previously in FIG. 5.

If the representative value is not found by processor P* and the rebalancing status of processor P* is in-process, then processor P* calculates the slice and owning processor $P^{2*}$ of the second rank for the given representative value, using a consistent hashing method (e.g., a highest random weight hashing), and forwards the query (i.e., the input representative value and digests) to processor $P^{2*}$. The reason for this is that this representative value may be in the grid's deduplication meta-data but it may still not have been migrated to the newly added P* processor. This forwarding process continues between processors, according to the consistent hashing ranking, until either finding the representative value by a processor on the forwarding chain, or reaching a processor for which the rebalancing status indicates completion.

If the representative value is found by a processor $P^{x*}$ on the chain (as indicated in FIG. 7), then processor $P^{x*}$ performs a digest matching procedure with the input digests and the contents of its local digests cache to find identical data sections. Processor $P^{x*}$ sends the following messages: (1) a reply message to processor P* that facilitates migration of the representative value and its corresponding digests from processor $P^{x*}$ to processor P*, and (2) a reply message to processor P that enables to continue the deduplication process of the similarity unit (as shown by steps (3) and (4) in FIG. 7, respectively). The deduplication then continues on processor P as specified in FIG. 5, previously, for distributed data deduplication.

If the representative value is not found by a processor $P^{x*}$ and the rebalancing status of this processor indicates completion (as indicated in FIG. 8), then processor $P^{x*}$ sends a reply message to processor P indicating that the representative value is not found (as shown by step (3) in FIG. 8). The number of hops in a forwarding chain can be defined with an upper bound, as the deduplication process is essentially approximate.

Finally, if the representative value is not found by processor P* and the rebalancing status of processor P* is complete, then processor P* sends a reply message to processor P indicating that the representative value is not found.

An additional mechanism may be implemented for performing rebalancing functionality for the distributed deduplication metadata when a processor and corresponding metadata slice are being normally removed from the processor grid. In one embodiment, the contents of the deduplication metadata slice of the processor being removed is distributed uniformly across remaining slices of deduplication metadata. Deduplication metadata in other slices is not modified.

For each representative value in a metadata slice being removed, a new slice to store the representative value and corresponding digests may be calculated. A consistent hashing method, such as the Highest Random Weight hashing method, may be used. For the given representative value, consistent hashing rank values for the metadata slices in the grid may then be calculated, where the calculation is performed without the metadata slice that is being removed. The slice with the highest rank value may then be selected. The representative value and associated digests may then be sent to be stored at the metadata slice selected in the previous step.

To recover data deduplication metadata when a processor fails, two approaches may be taken. A first approach is to store the meta-data of each similarity unit (i.e. representative value and digests) in K meta-data slices whose consistent hashing rank values for the representative value of the similarity unit are highest among the meta-data slices in the grid.

When a processor fails or is being removed, its representative values and corresponding digests are replicated from their backup slices to additional slices, by calculating for each affected representative value consistent hashing rank values for the slices in the grid without the slice of the failed/removed processor, and selecting the slice with the highest rank value from among the slices that were not yet used for the given representative value, to store an additional copy of the affected representative value and its corresponding digests.

A second approach is to avoid recovery of meta-data. This is possible because the similarity index can be defined to be approximate, and thus can represent a subset of the data. The effect on deduplication is typically temporary, as new data is being ingested.

Figure 9:
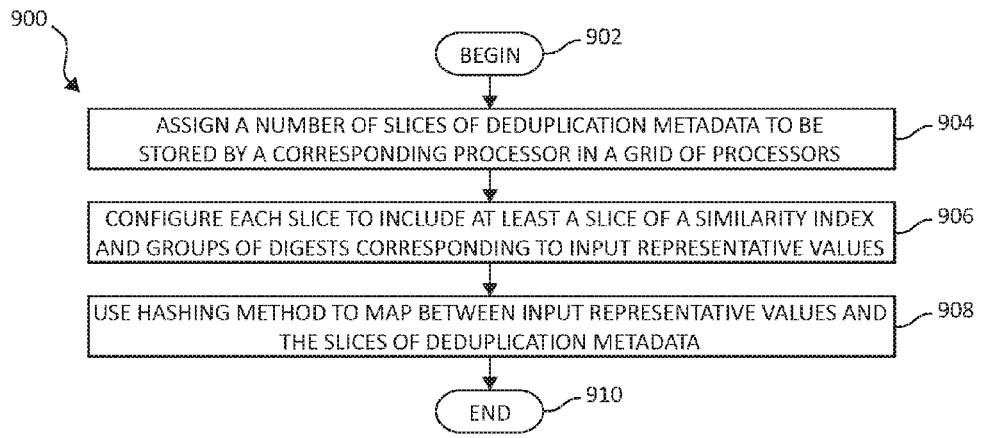
FIG. 9 is a flow chart diagram of an exemplary method for storing data deduplication metadata in a grid of processors according to one embodiment of the present invention.

Turning now to FIG. 9, an exemplary method 900 for facilitating deduplication metadata storage in a grid of processors is depicted in accordance with one embodiment of the present invention. Method 900 begins (step 902) with the assignment of a number of slices of deduplication metadata to be stored by a corresponding processor in a grid of processors (step 904).

Each metadata slice is configured to include at least one of a slice of a similarity index and groups of digests corresponding to representative values that may be included in the slice of the similarity index (step 906). A hashing method is then used to map between input representative values and the slices of deduplication metadata (step 908). The method 900 then ends (step 910).

Figure 10:
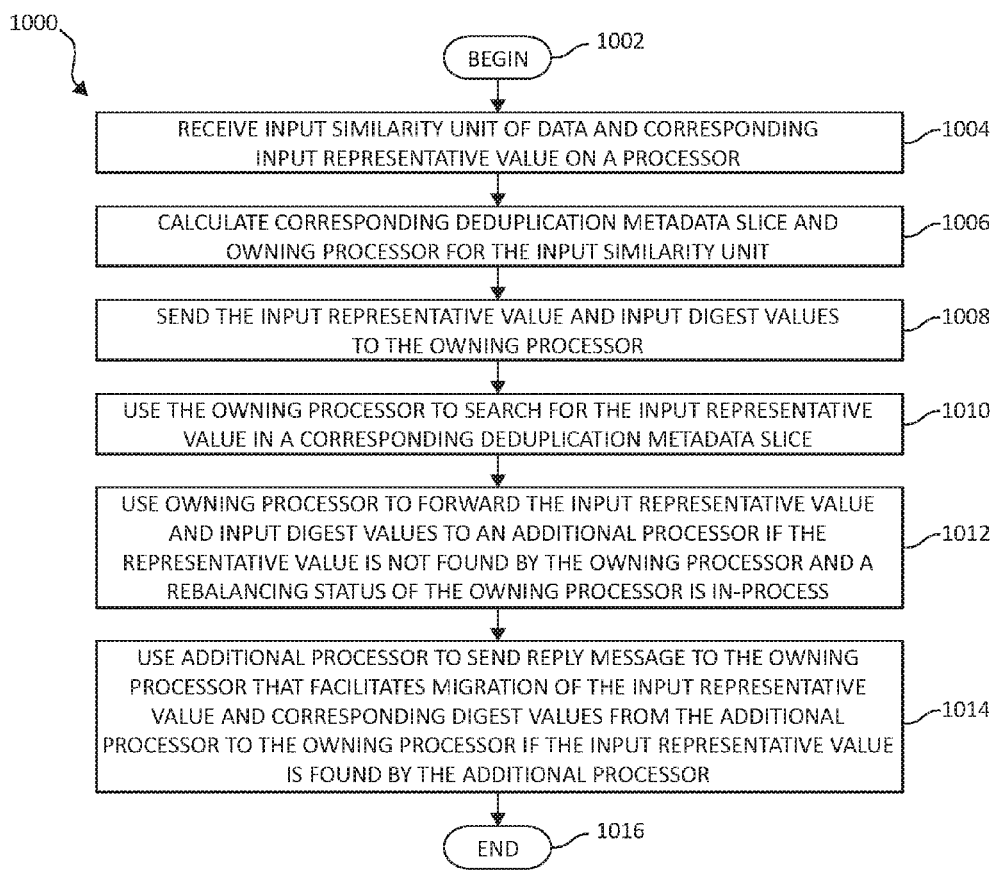
FIG. 10 is a flow chart diagram of an exemplary method for rebalancing distributed deduplication metadata among processors according to one embodiment of the present invention.

FIG. 10, following, depicts an exemplary method 1000 for rebalancing distributed deduplication metadata, in accordance with one embodiment of the present invention. Method 1000 begins (step 1002), with the receipt of an input similarity unit of data and a corresponding input representative value on a processor (step 1004). A corresponding deduplication metadata slice and owning processor for the input similarity unit is then calculated (step 1006).

In a following step 1008, the input representative value and input digest values are sent to the owning processor. The owning processor is used to search for the input representative value in a corresponding deduplication metadata slice (step 1010). The owning processor is then used to forward the input representative value and input digest values to an additional processor if the representative value is not found by the owning processor and a rebalancing status of the owning processor is determined to be in-process (step 1012)

In a following step 1014, an additional processor is then used to send a reply message to the owning processor that facilitates migration of the input representative value and corresponding digest values from the additional processor to the owning processor if the input representative value is found by the additional processor. The method 1000 then ends (step 1016).

Figure 11:
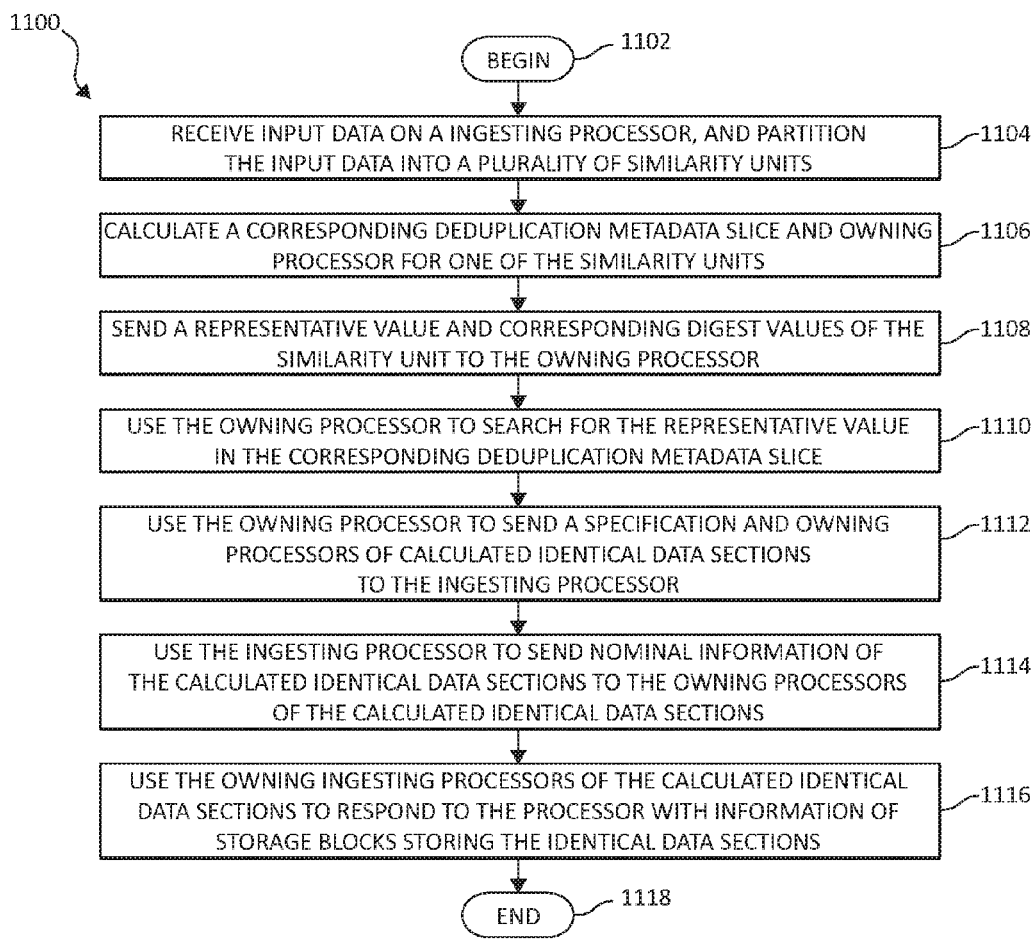
FIG. 11 is a flow chart diagram of an exemplary method for distributed, scalable data deduplication according to one embodiment of the present invention.

FIG. 11, following, depicts an exemplary method 1100 for distributed data deduplication in a grid of processors, again according to one embodiment of the present invention. Method 1100 begins (step 1102) with the receipt of input data on an ingesting processor, and by partitioning the input data into a number of similarity units (step 1104). A corresponding deduplication metadata slice and owning processor for one of the similarity units is calculated (step 1106).

In a following step 1108, a representative value and corresponding digest values of the similarity unit are then sent to the owning processor. The owning processor is then used to search for the representative value in the corresponding deduplication metadata slice (step 1110). The owning processor is then used to send a specification and owning processors of calculated identical data sections to the ingesting processor (step 1112). The ingesting processor is then used to send nominal information of the calculated identical data sections to the owning processors of the calculated identical data sections (step 1114).

In a following step 1116, the owning processors of the calculated identical data sections are then used to respond to the ingesting processor with information of storage blocks that are storing the identical data sections. The method 1100 then ends (step 1118).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for storing data deduplication metadata in a grid of processors, comprising:
    assigning each of a plurality of slices of deduplication metadata to be stored by a corresponding processor in a grid of processors; wherein each slice of the plurality of slices includes at least one of a slice of a similarity index and groups of digests corresponding to those of a plurality of representative values in the slice of the similarity index; and wherein the grid of processors further includes at least an owning processor comprising a first processor in the grid of processors responsible for storing data associated with the slices of deduplication metadata and an ingesting processor comprising a second processor responsible for receiving the data as the data is input into the grid of processors;
    using a hashing method to map between a plurality of input representative values and the plurality of slices of deduplication metadata;
    performing a deduplication operation by the owning processor or an additional processor using the slices of deduplication metadata on the input data to reduce redundantly stored data in the grid of processors;
    calculating the mapping between the plurality of input representative values and the plurality of slices of deduplication metadata using the hashing method to produce a consistent ranking on the plurality of slices of deduplication metadata for the plurality of input representative values;
    and storing one of the plurality of input representative values and groups of digests corresponding to the one of the plurality of input representative values in K metadata slices, where the K metadata slices have a highest rank value.

2. The method of claim 1, further including, for one of the plurality of input representative values, designating one of the plurality of slices of deduplication metadata with a highest rank to store the one of the plurality of input representative values and groups of digests corresponding to the one of the plurality of input representative values.

3. The method of claim 1, further including searching one of the plurality of input representative values in the plurality of slices of deduplication metadata according to a rank order.

4. The method of claim 1, wherein upon a removal or a failure of a processor in the grid of processors, replicating those of the plurality of representative values and groups of digests to additional slices of deduplication metadata by applying at least one of:
    determining those of the plurality of representative values and groups of digests that are stored in a slice of deduplication metadata corresponding to the removed or failed processor,
    calculating rank values for the plurality of slices of deduplication metadata without the slice of deduplication metadata corresponding to the removed or failed processor,
    selecting one of the plurality of slices of deduplication metadata having a highest rank value from among those of the plurality of slices of deduplication metadata not yet used for the plurality of representative values, and
    storing a copy of those of the plurality of input representative values and groups of digests in the selected one of the plurality of slices of deduplication metadata.

5. The method of claim 1, further including storing, by each of the processors in the grid of processors, user data processed via local ingests.

6. The method of claim 1, further including producing a consistent ranking on the plurality of slices of deduplication metadata for the plurality of input representative values using one of:
    a consistent hashing method, and
    a highest random weight hashing method.

7. A system for storing data deduplication metadata, comprising: a processor, operable in a grid of processors, that:
    assigns each of a plurality of slices of deduplication metadata to be stored in the grid of processors; wherein each slice of the plurality of slices includes at least one of a slice of a similarity index, and groups of digests corresponding to those of a plurality of input representative values in the slice of the similarity index; and wherein the grid of processors further includes at least an owning processor comprising a first processor in the grid of processors responsible for storing data associated with the slices of deduplication metadata and an ingesting processor comprising a second processor responsible for receiving the data as the data is input into the grid of processors;
    uses a hashing method to map between a plurality of input representative values and the plurality of slices of deduplication metadata;
    performs a deduplication operation by the owning processor or an additional processor using the slices of deduplication metadata on the input data to reduce redundantly stored data in the grid of processors;
    calculates the mapping between the plurality of input representative values and the plurality of slices of deduplication metadata using the hashing method to produce a consistent ranking on the plurality of slices of deduplication metadata for the plurality of input representative values;
    and stores one of the plurality of input representative values and groups of digests corresponding to the one of the plurality of input representative values in K metadata slices, where the K metadata slices have a highest rank value.

8. The system of claim 7, wherein the processor, for one of the plurality of input representative values, designates one of the plurality of slices of deduplication metadata with a highest rank to store the one of the plurality of input representative values and groups of digests corresponding to the one of the plurality of input representative values.

9. The system of claim 7, wherein the processor searches one of the plurality of input representative values in the plurality of slices of deduplication metadata according to a rank order.

10. The system of claim 7, wherein the processor, upon a removal or a failure of a processor in the grid of processors, replicates those of the plurality of representative values and groups of digests to additional slices of deduplication metadata by applying at least one of:
   determining those of the plurality of representative values and groups of digests that are stored in a slice of deduplication metadata corresponding to the removed or failed processor,
   calculating rank values for the plurality of slices of deduplication metadata without the slice of deduplication metadata corresponding to the removed or failed processor,
   selecting one of the plurality of slices of deduplication metadata having a highest rank value from among those of the plurality of slices of deduplication metadata not yet used for the plurality of representative values, and
   storing a copy of those of the plurality of input representative values and groups of digests in the selected one of the plurality of slices of deduplication metadata.

11. The system of claim 7, wherein each of the processors stores, in the grid of processors, user data processed via local ingests.

12. The system of claim 7, wherein the processor produces a consistent ranking on the plurality of slices of deduplication metadata for the plurality of input representative values using one of:
   a consistent hashing method, and
   a highest random weight hashing method.

13. A computer program product for storing data deduplication metadata in a grid of processors, the computer program product comprising a computer-readable storage medium having computer readable program code portions stored therein, the computer-readable program code portions comprising:
   an executable portion that assigns each of a plurality of slices of deduplication metadata to be stored by a corresponding processor in a grid of processors; wherein each slice of the plurality of slices includes at least one of a slice of a similarity index and groups of digests corresponding to those of a plurality of representative values in the slice of the similarity index; and wherein the grid of processors further includes at least an owning processor comprising a first processor in the grid of processors responsible for storing data associated with the slices of deduplication metadata and an ingesting processor comprising a second processor responsible for receiving the data as the data is input into the grid of processors;
   an executable portion that uses a hashing method to map between a plurality of input representative values and the plurality of slices of deduplication metadata;
   an executable portion that performs a deduplication operation by the owning processor or an additional processor using the slices of deduplication metadata on the input data to reduce redundantly stored data in the grid of processors;
   an executable portion that calculates the mapping between the plurality of input representative values and the plurality of slices of deduplication metadata using the hashing method to produce a consistent ranking on the plurality of slices of deduplication metadata for the plurality of input representative values;
   and an executable portion that stores one of the plurality of input representative values and groups of digests corresponding to the one of the plurality of input representative values in K metadata slices, where the K metadata slices have a highest rank value.

14. The computer program product of claim 13, further including, for one of the plurality of input representative values, an executable portion that designates one of the plurality of slices of deduplication metadata with a highest rank to store the one of the plurality of input representative values and groups of digests corresponding to the one of the plurality of input representative values.

15. The computer program product of claim 13, further including an executable portion that searches one of the plurality of input representative values in the plurality of slices of deduplication metadata according to a rank order.

16. The computer program product of claim 13, further including an executable portion that, upon a removal or a failure of a processor in the grid of processors, replicates those of the plurality of representative values and groups of digests to additional slices of deduplication metadata by applying at least one of:
   determining those of the plurality of representative values and groups of digests that are stored in a slice of deduplication metadata corresponding to the removed or failed processor,
   calculating rank values for the plurality of slices of deduplication metadata without the slice of deduplication metadata corresponding to the removed or failed processor,
   selecting one of the plurality of slices of deduplication metadata having a highest rank value from among those of the plurality of slices of deduplication metadata not yet used for the plurality of representative values, and
   storing a copy of those of the plurality of input representative values and groups of digests in the selected one of the plurality of slices of deduplication metadata.

17. The computer program product of claim 13, further including an executable portion that stores, by each of the processors in the grid of processors, user data processed via local ingests.

18. The computer program product of claim 13, further including an executable portion that produces a consistent ranking on the plurality of slices of deduplication metadata for the plurality of input representative values using one of:
   a consistent hashing method, and a highest random weight hashing method.

* * * * *